Patented Sept. 12, 1939

2,172,531

UNITED STATES PATENT OFFICE 2,172,531

FERMENTATION PROCESS FOR IMPROVING VEGETABLE AND ANIMAL OILS AND FATS AS WELL AS OTHER GLYCERIDES OF THE FATTY ACIDS

Willy Ekhard, Berlin-Pankow, Germany

No Drawing. Application October 31, 1935, Serial No. 47,628. In Germany November 2, 1934

18 Claims. (Cl. 99—122)

The present invention relates to a process for improving vegetable and animal oils and fats and other glycerides of the fatty acids.

The known methods of refining oils and fats are in part of physical and in part of chemical nature. The physical methods, include for example, the treatment of the fats with steam under high pressure. The chemical methods include for example the treatment with active carbon, fuller's earth, dioxide of hydrogen, sulphurous acid and the like. These methods have the drawback, that they are expensive and require complicated manufacturing plants.

It has also been proposed, to improve glycerides of the fatty acids by direct treatment with micro-organisms. The products refined in this way do not however fulfill commercial requirements.

It has now been found, that the said crude products can be improved as to odor, taste, stability and consistency in a fully satisfactory manner by subjecting the same to the influence of micro-organisms, which are taken up by a nutrient medium of foreign nature and are stirred up to full fermentation activity, and separating the treated material from the products of fermentation. The effect of the micro-organisms may hereby be favorably influenced by controlling the fermentation process in a manner known per se.

Instead of or in combination with the nutrient media of foreign nature the fermentation of which is caused by the micro-organisms, also enzymes may be used for influencing the materials to be treated. According to the invention, these enzymes may be used in solution, for example in water, prior to, during or after the treatment with fermenting nutrient mediae. In contrast to the known purely chemical or physical methods this is a method which rests on a biological basis and which differs fundamentally from the known unsatisfactory methods by the use of nutrient mediae of foreign nature and by the purification of the treated material. The novel process can for instance be carried out in the following manner:

Particularly effective microbes are the sugar fermenting microbes, such as saccharomycetes (yeasts), and also acidifiers, for example lactic acid producers, such as *Bacillus Delbrücki*, *Bacillus Leichmanni*, *Bacillus bulgaricus*, *Streptococcus thermophilus*, or other acidifiers such as for example producers of propionic acid, butyric acid and other microbes which produce organic acids. It is also possible to use a plurality of these microbes simultaneously or one after another.

The nutrient mediae used may be fermentable carbohydrates or specific substrates which stir up the microbes to full vital activity, for instance decoctions and infusions of animal or vegetable substances, which contain all necessary nutriments, and raising substances of vital importance for the microbes, such as Raulins solution.

Of the enzymes pepsin, papain, lab and diastase are particularly suitable. These ferments can with great advantage be used for the pre- and after-treatment of the oils and the fats. Said ferments can however also be used simultaneously with the microbes. It is for example possible, to combine lab with an alcoholic fermentation (yeast fermentation). On the other hand, these enzymes can also be combined with alcohol or acid formers or mixtures thereof, provided care is taken, that the pH required in each case is present. In many cases it has been found advantageous to neutralise the nascent lactic acid continuously with buffer mixtures or calcium or magnesium carbonate.

According to the invention, the product to be refined is mixed or emulsified with the fermenting sugar solution during the fermentation and after the fermentation has been completed the product is separated from the fermented solution and washed.

The advantage of the process according to the invention resides in this, that at or during the fermentative treatment the products of the exchange of matter of the micro-organisms will act upon the products to be refined in statu nascendi, whereby a particularly lasting effect is obtained. The fermentation takes place so that the product to be treated is brought into the exchange of matter process of the bacteria. The reactions which hereby take place can be considerably activated by maintaining definite acidities, if necessary by the addition of suitable buffer mixtures or magnesium or calcium carbonate and the maintenance of definite temperatures, and the reactions can be influenced by the addition of certain nutrients or catalysts or activators. Acidities of pH 4-7 have been shown to be suitable. The temperatures vary according to the microbes used, between room temperature and 60° C. The activators for the enzymes are for example chlorides, such as sodium chloride. Suitable catalysts for the microbic fermentation and particularly the yeast fermentation are light and heavy metals and oxides, hydroxides (also in colloidal form) and salts of the same, such as tin, nickel, zinc oxide, nickel carbonate, manganese salts, tin chloride, sodium sulfide and others. On account of their bactericidal effect the metals are however added in very small amounts (for instance about 0.5%) in order not to stop the fermentation. It is also advantageous to use mixtures of such metal compounds, because the new salts formed from such compounds are more effective in statu nascendi than previously-formed preparations. A mixture of $Na_2SO_3$ and $SnCl_2$ is for instance more effective than prepared $SnSO_3$. The usual nutrient salts, such as magnesium sulfate, potassium carbonate, ammonium phosphate and the like are added in sufficient amounts. The reaction controls known in fermentation processes of all kinds and consisting in adding substances, such as for instance sodium sulfite, magnesium sulfate and other substances, treatment with ultraviolet rays and the like, can also be used during the fermentation of the glycerides of the fatty acids, in accordance with the present invention.

For the actuation of the fermentation processes a continuous mild oxidation, which does not stop the fermentation, has been shown to be advantageous. This oxidation may for example be carried out by passing air through the mass, by ozonizing cautiously, by gradual addition of peroxides, permanganates, hydrogen dioxide and the like. During the fermentation, in such case, the biological influences may also cause reductions and simultaneously a more intense oxidation. According to the invention, through the simultaneous oxidation a product of increased stability is obtained, and, in contradiction to the generally accepted view, that anaerobic bacilli and ferments only can exert their effect when shut off from the air, it has been found, that the presence of air is necessary. It has been found, and it is also known from the literature (see for instance P. Lindner: "Mikroskopische Betriebskontrolle in den Gärungsgewerben," vol. 5, 6th edition, published by Paul Parey, Berlin, 1930, page 624), that for example, anaerobic lactic acid formers by aerating, i. e., under oxidizing influence, well may be converted into the aerobic state and nevertheless continue to exert their effect. Beiyer-inck has, for example, under ample admission of air converted the *Bacillus fermentum* into the *Bacillus Delbrücki*, i. e., into a form which acidifies only little, but which grows very readily on agar. The fact, that anaerobe bacteria can be converted into an aerobic modification, renders it also possible, besides using the aerobic form of the organism, to also oxidize during the fermentation. This is important, because certain decomposition products formed by the fermentation apparently continuously attain a higher stage of oxidation.

According to the invention this aerobic state of the bacteria is utilized, because a satisfactory improvement through the fermentative influence can only be obtained when mild oxidation agents are simultaneously used.

The apparent inconsistency in the use of oxidants in so mild a form, that they neither destroy the bacteria nor disturb the fermentation, is therefore, as has been found, a condition for achieving the effect which hitherto has been sought for in vain.

According to the invention, not only the taste is improved essentially but also a strong bleaching effect and a good preservation is obtained. As to the preservation it is of advantage, that the microbes, after they have exerted their effect, together with the products of their exchange of matter, are completely removed from the starting material by washing. The invention does therefore also in this respect deviate from the usual biological preservation as used for instance for silo fodder, sour cucumbers, pickled cabbage and the like. The acids formed (for instance lactic acid) and other products from the exchange of matter are thus removed. In spite of this the material has a much greater stability and a greater resistance against the influence of heat and light. Soya oil, peanut oil, linseed oil, turnip oil, cotton oil, maize oil, beef-tallow, lard and other matter may for instance be treated in this way.

The invention can not only be used for improving raw products of the said class, but can also be employed for bringing back into their original state oils and fats, which have deteriorated (i. e., become rancid) by storing. It is typical of the effect of the treatment, that, for example in treating vegetable oils the undesirable characteristic taste of the crude product disappears completely and is replaced by a neutral taste, strongly resembling that of olive oil. By treating animal fats, for example beef tallow, it is possible to completely remove the difficultly removable disagreeable animal taste characteristic of the fat and to produce a neutral fat. This was hitherto not possible for instance in treating tallow.

Liver oils and other oils secured from fish and other marine animals are greatly improved by this process. When these oils are treated in accordance with the present invention, products are obtained which have a neutral smell and taste. The invention can therefore be used for the treatment of such substances instead of the cumbersome hydrogenating and deodorizing methods hitherto employed.

It should be noted, that the microbes do not only influence the oils and fats in the described manner when applied directly, but also when used for treatment of the materials from which the oils and fats are obtained, such as soya beans, cottonseed, rape seed, lupines and the like. The products pretreated in this way will in contrast to non-pretreated materials give a very pure oil. It should also be noted that in the production of oil, the residues from the oil presses, which normally only give an oil of second quality, will give oils of excellent quality when treated according to this method.

The present method can also be used with excellent results for producing fine tallow from raw tallow or other fats from raw animal materials, and for improving such products. Fine tallow, the so-called premier jus, is at present obtained by melting raw tallow at relatively high temperatures (about 60° C. and more), and is thereupon cleared at still higher temperatures. The tallow obtained in this way has a yellow color, a typical tallow taste, is hard, crumbling and not spreadable. The yield of the known process is only 78%, because much fat remains in the scrap. The scrap is roasted, pressed to form cakes and sold as cattle food. If now the raw tallow, in accordance with the invention, is treated with nutrient media of foreign nature, the fermentation of which has been caused by bacteria, the cell tissue is very finely subdivided (macerated) so that almost the entire fat content is set free. The yield increases to about 90%. Another advantage is, that the biological action takes place at a temperature below the melting point of the tallow, so that the fat is not discolorized by the influence of high temperatures and a white product is obtained. Since, as will be known, the digestibility of albumens is considerably reduced by heating, the scrap will, in contrast to products secured by the known methods which operate with high temperatures, maintain its full digestibility. The scrap obtained in accordance with this invention is also finely subdivided and of an agreeable taste, so that it can also be used in human food, for example in sausage fillings and the like.

In contrast to the known decomposition of tallow by lactic acid producers, in which anaerobic bacteria are used and the air is completely shut off, and in which very long periods of decomposition are required, for example up to six days, the decomposition and the improvement of the raw product, is according to this invention performed by means of anaerobic bacteria and in the presence of air or other mild oxidants. Hereby the properties of the anaerobic bacteria are changed, and simultaneously with the fermentation, a mild oxidation takes place.

According to the invention, the change of the anaerobic bacteria, which is necessary for the decomposition of the raw products, is caused by mixing the suitably mechanically comminuted raw tallow with a nutrient medium by means of an efficient stirring device. The nutrient medium may for instance, be a fermentable sugar solution, which eventually may be inoculated with bacteria and to which suitable nutrient salts may be added. Through the stirring, a definite amount of air is always forced into the mixture, so that the desired oxidation and aeration take place. A strong air current may of course also be introduced during the fermentation. Oxidants, such as hydrogen peroxide, solutions of persalts and the like may also be added. The doses must hereby of course be so small, that no bactericidal effects are created.

Referring to bacteria, the lactic acid producers, such as for instance *Bacillus bulgaricus, Streptococcus thermophilus, Bacillus Delbrücki, Bacillus Leichmanni* and some others are the most important. For the separation of the protein or for the decomposition of the cell tissue, enzymes, such as for instance lab, pepsin and other albumen decomposing ferments, may also be used.

Through the influence of the lactic acid in statu nascendi and the albumen decomposition ferments the cell tissue is so finely disintegrated, that it is unable to hold the fat, and simultaneously it improves the freed fat.

It is known, that the optimum effect of enzymes, such as lab, pepsin, diastase and the like is obtained under total exclusion of air, i. e., when no oxidation takes place. The aeration will of course lower the activity of the enzymes, but this lack in activity is more than compensated by the said favorable oxidation effects. This is also the case with the anaerobic bacteria, particularly when the anaerobic bacteria are not converted into the anaerobic modification.

Since it is during such bacterial fermentations that effect of certain enzymes which is of importance, the fermentation can also be carried out with the isolated enzymes themselves, for instance with the liquor pressed out of the yeast, with autolysates of enzymatic activity and with combinations of these bacterial enzymatic solutions.

The olfactory and gustative character of glycerides of the fatty acids can according to the invention also be changed and improved by esterification by biological methods. The esterification may be combined with the described fermentation processes or be carried out separately. Esterifications must take place by the use of mixed alcoholic-acid fermentation (for instance of yeast and *Bacillus bulgaricus*). Such esterifications can for instance be obtained by means of butyric acid bacteria, lactic acid bacteria, acetic acid bacteria particularly *Bacterium acetosum*, and various yeasts and combinations of these organisms, eventually in the presence of ethyl alcohol, butyl and other higher alcohols. Referring to bacteria which are pernicious per se, such as for instance the butyric acid bacteria, in each case, of course only so much will be used as is required for the esterification.

In all cases it has been found advantageous to utilize the previously mentioned mild oxidation of the treated substances during the fermentation.

As to the yeasts it should be noted, that in using the same together with the simplest form of oxidation, i. e., when air is passed through the mass, such yeasts develop a particularly great activity, such as will be known from the so-called air-yeast process. In this, in contrast to the use of anaerobic bacteria, the optimum effect is achieved, since it of course is advantageous that the fermentative activity should be as strong as possible.

The novel process is particularly well suited for shortening the usual refining methods, such as bleaching and steam treatment, and thereby rendering the production process cheaper, and for replacing to a wide extent the hydrogenation of marine animal oils. A combination of the usual refining process with the biological process is highly desirable. The disclosed treatment may for example form a continuation of a previous bleaching and steam treatment. It is however still more advantageous to first utilize the biological treatment and in continuation thereof to subject the material to the usual refining treatment, such as deacidification, bleaching and steam treatment. A very good effect is attained when during the fermentation the usual bleaching agents, such as fuller's earth, silica gel, active carbon or mixtures of the same are added to the emulsion during the incubation. It has also been found advantageous in the course of the fermentation to pass air, carbon dioxide and other gases harmless to the fats through the emulsion.

In the production of margarine the treatment causes a strong aromatization of the starting materials used, in that the same distinctly take up the aroma of natural butter. For this special purpose it is advantageous to treat the entire mass of fat in the described manner before the churning takes place, and thereupon to free the fat from the products of the exchange of matter, for instance by means of centrifuges or by filtering without however washing the starting materials, as described in the following examples.

*Example 1*

100 kg. of whale oil are mixed with 100 kg. of a fermentable sugar solution of about 3%, emulsified and treated with air which is blown through the mass. The sugar solution has previously been inoculated with about 5 kg. of pressed yeast. When the fermentation has commenced, about 2 kg. of neutral sodium sulfite are added and simultaneously for instance about 500 g. of tin chloride are added as a catalyst, to accelerate the reduction process. The emulsion is kept on a temperature of 30° C. for about 6 hours and simultaneously air is blown through forcibly. The air current is thereupon cut off, that the fat can separate from the solution, whereupon the solution is drawn off and the so refined oil is washed, finally neutralized, and filtered. The treatment can be repeated one or more times.

*Example 2*

100 kg. of peanut oil are emulsified at about 37° to 40° C. with about 50 liters of water to which lab ferment has been added in a proportion of about 1:10,000 and air is blown through the emulsion. After 2 hours the air supply is stopped. The oil separates from the ferment solution, which is drawn off, and the oil is freed from the albumens which have been separated out, by filtration or in a centrifugal separator. After this treatment, the oil is again emulsified with the same amount of a fermentable sugar solution (for instance invert sugar) which has been inoculated with 5 kg. of a mixed culture of *Bacillus bulgaricus* and *Streptococcus thermophilus*. (This culture can be prepared by inoculating 5 liters of a Raulin's solution with a culture of both organisms and incubating at about 42° C. until the optimum acidity has been reached.) The culture is suitably neutralized before it is used to inoculate the nutritive medium. After this medium has been inoculated it is emulsified with the oil at about 42° C., and air is blown through the emulsion. After about 6 hours the air supply is interrupted, and the treatment is continued as described in Example 1.

*Example 3*

1000 kg. of raw, untreated tallow are comminuted in the usual manner and are filled into a suitable vessel together with about 1500 liters of invert sugar (3%), which have been inoculated with about 5% of a mixed culture of *Streptococcus thermophilus* and *Bacillus bulgaricus*. The mixed culture is thereupon allowed to grow, for instance in a Raulin's solution, and when it has attained the optimum of acidity it is neutralized and used as inoculation material. The above named mixture of comminuted raw tallow and inoculated nutrient medium are mixed at a temperature corresponding to the propagating temperature of the micro-organisms, and air is blown through forcibly. After about 6 to 8 hours the cell tissue is disintegrated to such a degree, that the fat can be removed from it, and the nutrient medium is drawn off through a drain cock. The product is thereupon washed with hot water, whereby the tallow melts. After the melting has been completed the disintegrated scrap and the wash water are drawn off, and the scrap is collected separately. The clearing of the tallow above its melting point can be improved in the known way by pouring in some water in which ordinary salt has been dissolved. The quality can be further improved by repeating the described fermentation process one or more times after the disintegrated tissue (scrap) has been removed. This example could also be followed by using enzymes, and it is possible to combine the bacterial cultures named in the first part of the example with enzymes.

*Example 4*

Soya oil is, after previous deacidification, emulsified under continuous stirring with the nutrient medium, which contains the microbes and their nutriment (for instance yeasts and fermentable carbohydrates), and the emulsion is exposed to the optimum incubating temperature. The treatment can, as mentioned, take place with the simultaneous addition of small amounts of fuller's earth, silica gel and active carbon. Certain gases or mixtures of gases, such as air, can be passed through the emulsion during the entire fermentation process. After the fermentation has been finished the oil or fat is carefully separated from the fermentation fluid, by treatment in a centrifugal separator or by filtering, and the oil or fat is subjected to a short washing process in hot water, to which a mild neutralization agent, such as sodium bicarbonate or ammonia, is added. These fermentation and washing processes may be repeated as often as desirable.

*Example 5*

Beef tallow, which has been melted to separate the tissue and other undesired matter, is liquefied by cautious heating it is emulsified by stirring with a fermentation liquid, which for example contains lactic acid producers, such as *Bacillus bulgaricus, Streptococcus thermophilus, Bacillus Delbrücki* and other microbes. At the optimum fermentation temperature of, for instance 42° C. the incubating is carried through with the use of *Bacillus bulgaricus*. As in the last example, the fermentation treatment can be carried out with or without the addition of the said bleaching agents and with or without leading gases through the mass. When the fermentation is finished, the treatment is continued in the manner described above, by separating the fermentation fluid from the fat and the latter is purified by being washed out with hot, mildly alkaline water. The process can, if required, be repeated one or more times.

I claim:

1. A process for improving vegetable and animal oils and fats and other glycerides of the fatty acids, which comprises subjecting the same to the action of micro-organisms of the class consisting of bacteria which produce an organic acid, and yeasts, in the presence of a carbohydrate which can be fermented by means of said micro-organisms, and separating the treated starting material, subsequent to said treatment by fermentation, from the material resulting from said fermentation.

2. A process for improving vegetable and animal oils and fats and other glycerides of the fatty acids, which comprises subjecting the same simultaneously to the action of bacteria which produce an organic acid, and of yeasts, in the presence of a carbohydrate which can be fermented by means of said bacteria and yeasts, and separating the treated starting material, subsequent to said treatment by fermentation, from the material resulting from said fermentation.

3. A process for improving vegetable and animal oils and fats and other glycerides of the fatty acids, which comprises subjecting the same successively to the action of bacteria which produce an organic acid, and to the action of yeasts, in the presence of a carbohydrate which can be fermented by means of said bacteria and yeasts, and separating the treated starting material, subsequent to said treatment by fermentation, from the material resulting from said fermentation.

4. A process for improving vegetable and animal oils and fats and other glycerides of the fatty acids, which comprises subjecting the same to the action of micro-organisms of the class consisting of bacteria which produce an organic acid, and yeasts, in the presence of a carbohydrate which can be fermented by means of said micro-organisms, and separating the treated starting material, subsequent to said treatment by fermentation, from the material resulting from said fermentation, while maintaining a pH value of from about four to seven during the fermentation.

5. A process for improving vegetable and animal oils and fats and other glycerides of the fatty acids, which comprises subjecting the same to the action of micro-organisms of the class consisting of bacteria which produce an organic acid, and yeasts, in the presence of a carbohydrate which can be fermented by means of said micro-organisms, and separating the treated starting material, subsequent to said treatment by fermentation, from the material resulting from said fermentation, while maintaining a temperature of about 20° C. to 60° C. during the fermentation.

6. A process for improving vegetable and animal oils and fats and other glycerides of the fatty acids, which comprises subjecting the same to the action of micro-organisms of the class consisting of bacteria which produce an organic acid, and yeasts, in the presence of a carbohydrate which can be fermented by means of said micro-organisms, and separating the treated starting material, subsequent to said treatment by fermentation, from the material resulting from said fermentation, while activating the fermentation by means of a catalyst.

7. A process for improving vegetable and animal oils and fats and other glycerides of the fatty acids, which comprises subjecting the same to the action of micro-organisms of the class consisting of bacteria which produce an organic acid, and yeasts, in the presence of a carbohydrate which can be fermented by means of said micro-organisms, and separating the treated starting material, subsequent to said treatment by fermentation, from the material resulting from said fermentation, while conducting the fermentation in the presence of nutrient material.

8. A process for improving vegetable and animal oils and fats and other glycerides of the fatty acids, which comprises subjecting the same to the action of micro-organisms of the class consisting of bacteria which produce an organic acid, and yeasts, in the presence of a carbohydrate which can be fermented by means of said micro-organisms, and separating the treated starting material, subsequent to said treatment by fermentation, from the material resulting from said fermentation, and also treating the substance to be improved with an aqueous solution of an enzyme.

9. A process for improving vegetable and animal oils and fats and other glycerides of the fatty acids, which comprises subjecting the same to the action of an aqueous solution of an enzyme, and then subjecting the substance to be improved to the action of micro-organisms of the class consisting of bacteria which produce an organic acid, and yeasts, in the presence of a carbohydrate which can be fermented by means of said micro-organisms, and separating the treated starting material, subsequent to said treatment by fermentation, from the material resulting from said fermentation.

10. A process for improving vegetable and animal oils and fats and other glycerides of the fatty acids, which comprises subjecting the same to the action of micro-organisms of the class consisting of bacteria which produce an organic acid, and yeasts, in the presence of a carbohydrate which can be fermented by means of said micro-organisms, and separating the treated starting material, subsequent to said treatment by fermentation, from the material resulting from said fermentation, and also treating the substance to be improved with an aqueous solution of an enzyme, said treatment with an enzyme taking place after the bacterial treatment.

11. A process for improving vegetable and animal oils and fats and other glycerides of the fatty acids, which comprises subjecting the same to the action of micro-organisms of the class consisting of bacteria which produce an organic acid, and yeasts, in the presence of a carbohydrate which can be fermented by means of said micro-organisms, and separating the treated starting material, subsequent to said treatment by fermentation, from the material resulting from said fermentation, said fermentable material containing a substance selected from a group consisting of Raulin's solution, a decoction of animal matter, a decoction of vegetable matter, an infusion of animal matter, and an infusion of vegetable matter.

12. A process for improving vegetable and animal oils and fats and other glycerides of the fatty acids, which comprises subjecting the same to the action of micro-organisms of the class consisting of bacteria which produce an organic acid, and yeasts, in the presence of a carbohydrate which can be fermented by means of said micro-organisms, and separating the treated starting material, subsequent to said treatment by fermentation, from the material resulting from said fermentation, while mildly oxidizing the mixture.

13. A process for improving vegetable and animal oils and fats and other glycerides of the fatty acids, which comprises subjecting the same to the action of micro-organisms of the class consisting of bacteria which produce an organic acid, and yeasts, in the presence of a carbohydrate which can be fermented by means of said micro-organisms, and separating the treated starting material, subsequent to said treatment by fermentation, from the material resulting from said fermentation, the micro-organisms being anaerobic, and being oxidized during the fermentation.

14. A method of improving a raw product which contains fat, which comprises mixing said raw product with a nutrient medium consisting of carbohydrates for anaerobic bacteria, causing said bacteria to ferment said medium, and mildly oxidizing the mixture during the fermentation.

15. A method of improving a raw product which contains fat, which comprises mixing said raw product with a nutrient medium consisting of carbohydrates for anaerobic bacteria, causing said bacteria to ferment said medium, and mildly oxidizing the mixture during the fermentation, and also treating the raw material with an enzyme.

16. A process for improving margarine, which comprises treating the fat prior to churning with micro-organisms of the class consisting of bacteria which produce an organic acid, and yeasts, in the presence of a carbohydrate which can be fermented by means of said micro-organisms, and then treating the fat so as to separate the foreign fermentation products therefrom substantially, said foreign fermentation products substantially being alcohol and lactic acid respectively formed by the action of the micro-organisms.

17. A process for improving vegetable and animal oils and fats and other glycerides of the fatty acids, which comprises mixing the material to be improved with a carbohydrate solution which can be fermented by micro-organisms of the class consisting of bacteria which produce an organic acid, and yeasts, subjecting the mixture obtained to the action of said micro-organisms, and separating the treated starting material, subsequent to said treatment by fermentation, from the material resulting from said fermentation.

18. A process for improving vegetable and animal oils and fats and other glycerides of the fatty acids, which comprises emulsifying the material to be improved with a carbohydrate solution which can be fermented by micro-organisms of the class consisting of bacteria which produce an organic acid, and yeasts, subjecting the mixture obtained to the action of said micro-organisms, and separating the treated starting material, subsequent to said treatment by fermentation, from the material resulting from said fermentation.

WILLY EKHARD.